(12) United States Patent
Tsai et al.

(10) Patent No.: US 11,067,743 B1
(45) Date of Patent: Jul. 20, 2021

(54) ELECTRONIC DEVICE WITH LIGHT GUIDE MODULE COMPRISING TWO LIGHT GUIDE UNITS AND ELASTIC UNIT THERE BETWEEN

(71) Applicant: Wistron NeWeb Corp., Hsinchu (TW)

(72) Inventors: Chi-Wen Tsai, Hsinchu (TW); Che-Min Lin, Hsinchu (TW); Shin-Jie Ho, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 17/026,588

(22) Filed: Sep. 21, 2020

(30) Foreign Application Priority Data

Feb. 7, 2020 (TW) .................................. 109103802

(51) Int. Cl.
*F21V 8/00* (2006.01)
*F21V 17/00* (2006.01)
*F21V 11/08* (2006.01)

(52) U.S. Cl.
CPC ............ *G02B 6/0088* (2013.01); *F21V 11/08* (2013.01); *F21V 17/00* (2013.01); *G02B 6/0078* (2013.01)

(58) Field of Classification Search
CPC .. G02B 6/0075; G02B 6/0076; G02B 6/0078; G02B 6/008
See application file for complete search history.

(56) References Cited

U.S. PATENT DOCUMENTS 8,469,577 B2 * 6/2013 Kang ................... G02B 6/0088
362/616

* cited by examiner

*Primary Examiner* — Robert J May
(74) *Attorney, Agent, or Firm* — McClure, Qualey & Rodack, LLP (57) ABSTRACT

A light guide module is provided. The light guide module includes a first light guide unit, a second light guide unit and an elastic unit. The elastic unit is disposed between the first light guide unit and the second light guide unit. One side of the elastic unit is connected to the first light guide unit, and the other side of the elastic unit is connected to the second light guide unit. In an initial state, a first distance is formed between the first light guide unit and the second light guide unit. In an extended state, the elastic unit is elastically deformed, and a second distance is formed between the first light guide unit and the second light guide unit.

16 Claims, 8 Drawing Sheets

ELECTRONIC DEVICE WITH LIGHT GUIDE MODULE COMPRISING TWO LIGHT GUIDE UNITS AND ELASTIC UNIT THERE BETWEEN

CROSS REFERENCE TO RELATED APPLICATIONS

This application claims priority of Taiwan Patent Application No. 109103802, filed on Feb. 7, 2020, the entirety of which is incorporated by reference herein.

BACKGROUND OF THE INVENTION

Field of the Invention

The present invention relates to a light guide module, and in particular to a light guide module capable of adjusting the distance between the light guide posts.

Description of the Related Art

The conventional electronic device has a housing, a light guide module and a plurality of light sources. The housing has a plurality of light output holes. The light guide module corresponds to the light output holes to guide the light provided by the light sources to the light output holes. Conventionally, manufacturing differences may occur on the light output holes, the light guide module and the light sources. The light provide by the light sources cannot be sufficiently guided to the light output holes. There are therefore problems with the conventional design such as light mixing and insufficient light output.

BRIEF SUMMARY OF THE INVENTION

Embodiments of the invention are provided to address the aforementioned difficulty.

In one embodiment, a light guide module is provided. The light guide module includes a first light guide unit, a second light guide unit and an elastic unit. The elastic unit is disposed between the first light guide unit and the second light guide unit. One side of the elastic unit is connected to the first light guide unit, and the other side of the elastic unit is connected to the second light guide unit. In an initial state, a first distance is formed between the first light guide unit and the second light guide unit. In an extended state, the elastic unit is elastically deformed, and a second distance is formed between the first light guide unit and the second light guide unit.

In another embodiment, an electronic device is provided. The electronic device includes a housing, a circuit board and a light guide module. The housing includes a first housing opening and a second housing opening. The circuit board includes a first light source and a second light source, wherein the first light source provides a first light, and the second light source provides a second light. The light guide module includes a first light guide unit, a second light guide unit and a first elastic unit. The first light guide unit corresponds to the first light source and the first housing opening, wherein the first light guide unit guides the first light, and the first light passes through the first housing opening. The second light guide unit corresponds to the second light source and the second housing opening, wherein the second light guide unit guides the second light, and the second light passes through the second housing opening. The first elastic unit is disposed between the first light guide unit and the second light guide unit, wherein one side of the first elastic unit is connected to the first light guide unit, and the other side of the first elastic unit is connected to the second light guide unit. In an initial state, a first distance is formed between the first light guide unit and the second light guide unit, and in an extended state, the first elastic unit is elastically deformed, and a second distance is formed between the first light guide unit and the second light guide unit.

In the light guide module of the embodiment of the invention, an elastic unit is utilized to adjust the distance between the first light guide unit and the second light guide unit. Therefore, even though the housings have manufacturing differences, the first light guide unit and the second light guide unit can be made to correspond sufficiently to the first housing opening and the second housing opening. Conventional problems such as light mixing and insufficient light output can be prevented.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
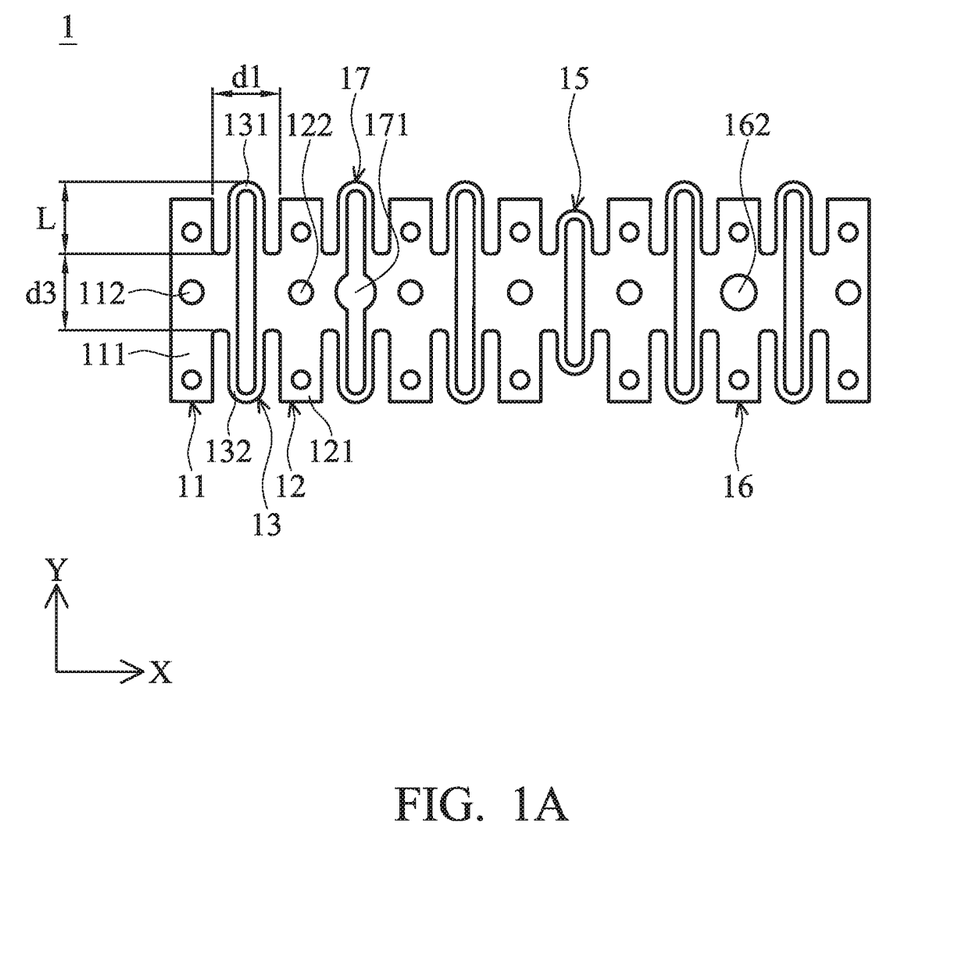
FIG. 1A is a front view of a light guide module of the embodiment of the invention, wherein the light guide module is in an initial state.
Figure 1B:
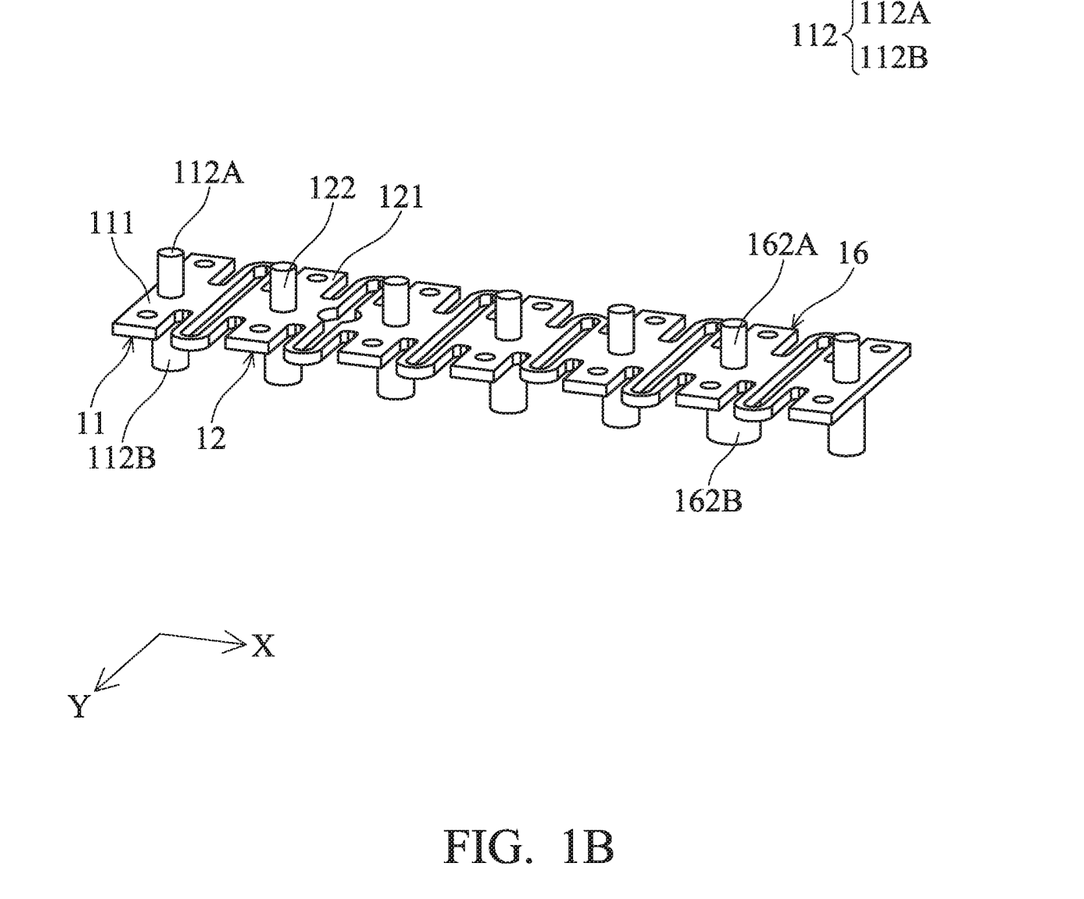
FIG. 1B is a perspective view of the light guide module of the embodiment of the invention.
Figure 1C:
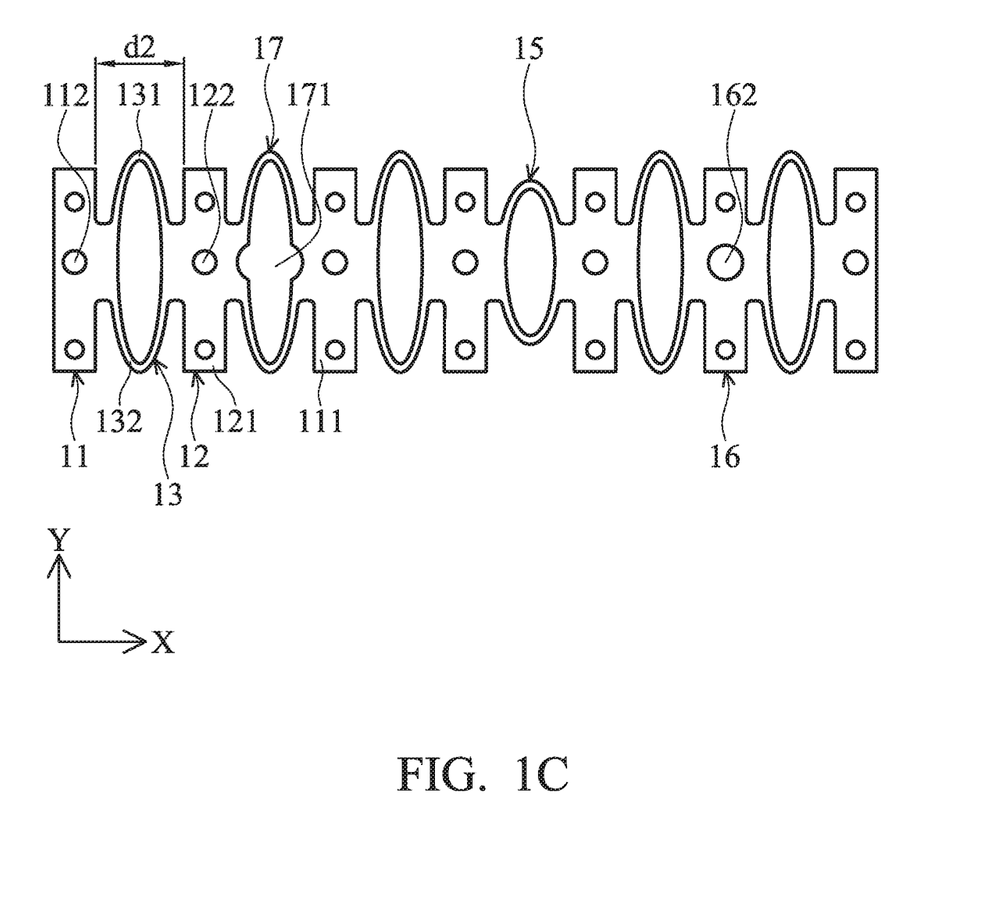
FIG. 1C is a front view of the light guide module of the embodiment of the invention, wherein the light guide module is in an extended state.

FIG. 1A is a front view of a light guide module of the embodiment of the invention, wherein the light guide module is in an initial state. FIG. 1B is a perspective view of the light guide module of the embodiment of the invention. FIG. 1C is a front view of the light guide module of the embodiment of the invention, wherein the light guide module is in an extended state. With reference to FIGS. 1A, 1B and 1C, the light guide module 1 of the embodiment of the invention includes a first light guide unit 11, a second light guide unit 12 and an elastic unit (first elastic unit) 13. The elastic unit 13 is disposed between the first light guide unit 11 and the second light guide unit 12. One side of the elastic unit 13 is connected to the first light guide unit 11, and the other side of the elastic unit 13 is connected to the second light guide unit 12. In an initial state, a first distance d1 is formed between the first light guide unit 11 and the second light guide unit 12 (FIG. 1A). In an extended state, the elastic unit 13 is elastically deformed, and a second distance d2 is formed between the first light guide unit 11 and the second light guide unit 12 (FIG. 1C).

With reference to FIGS. 1A, 1B and 1C, in one embodiment, the first light guide unit 11, the second light guide unit 12 and the elastic unit 13 are integrally formed. In one embodiment, the first light guide unit 11 comprises a first unit base 111 and a first light guide post 112. The second light guide unit 12 comprises a second unit base 121 and a second light guide post 122. The first light guide post 112 is connected to the first unit base 111. The second light guide post 122 is connected to the second unit base 121. One side of the elastic unit 13 is connected to the first unit base 111, and the other side of the elastic unit 13 is connected to the second unit base 121.

With reference to FIGS. 1A and 1C, in one embodiment, in the initial state, the first light guide post 112 is naturally parallel to the second light guide post 122 (FIG. 1A). In the extended state, the first light guide post 112 is also naturally parallel to the second light guide post 122 (FIG. 1C). In other words, in the extended state, the light guide module 1 is not twisted in extension.

With reference to FIGS. 1A and 1C, in one embodiment, in the initial state, the first unit base 111, the second unit base 121 and the elastic unit 13 are located on the same plane (FIG. 1A). In the extended state, the first unit base 111, the second unit base 121 and the elastic unit 13 are also located on the same plane (FIG. 1C). In other words, in the extended state, the light guide module 1 is not twisted in extension.

With reference to FIGS. 1A and 1C, in one embodiment, the elastic unit 13 comprises a first elastic arm 131 and a second elastic arm 132. The first elastic arm 131 faces the second elastic arm 132. One end of the first elastic arm 131 is connected to the first unit base 111. The other end of the first elastic arm 131 is connected to the second unit base 121. One end of the second elastic arm 132 is connected to the first unit base 111, and the other end of the second elastic arm 132 is connected to the second unit base 121.

With reference to FIGS. 1A and 1C, in one embodiment, the first elastic arm 131 and the second elastic arm 132 are U-shaped. In one embodiment, in the initial state, the first distance d1 is formed between the first light guide unit 11 and the second light guide unit 12 in the first direction X. In the extended state, the second distance d2 is formed between the first light guide unit 11 and the second light guide unit 12 in the first direction X. The first elastic arm 131 has an elastic arm length L in a second direction Y. A third distance d3 is formed between the first elastic arm 131 and the second elastic arm 132 in the second direction Y. In the initial state, the ratio of the elastic arm length L to the third distance d3 is greater than 0.9. The first direction X is perpendicular to the second direction Y. With the above ratio of elastic arm length L to third distance d3, the elastic unit 13 provides sufficient elasticity.

Figure 2:
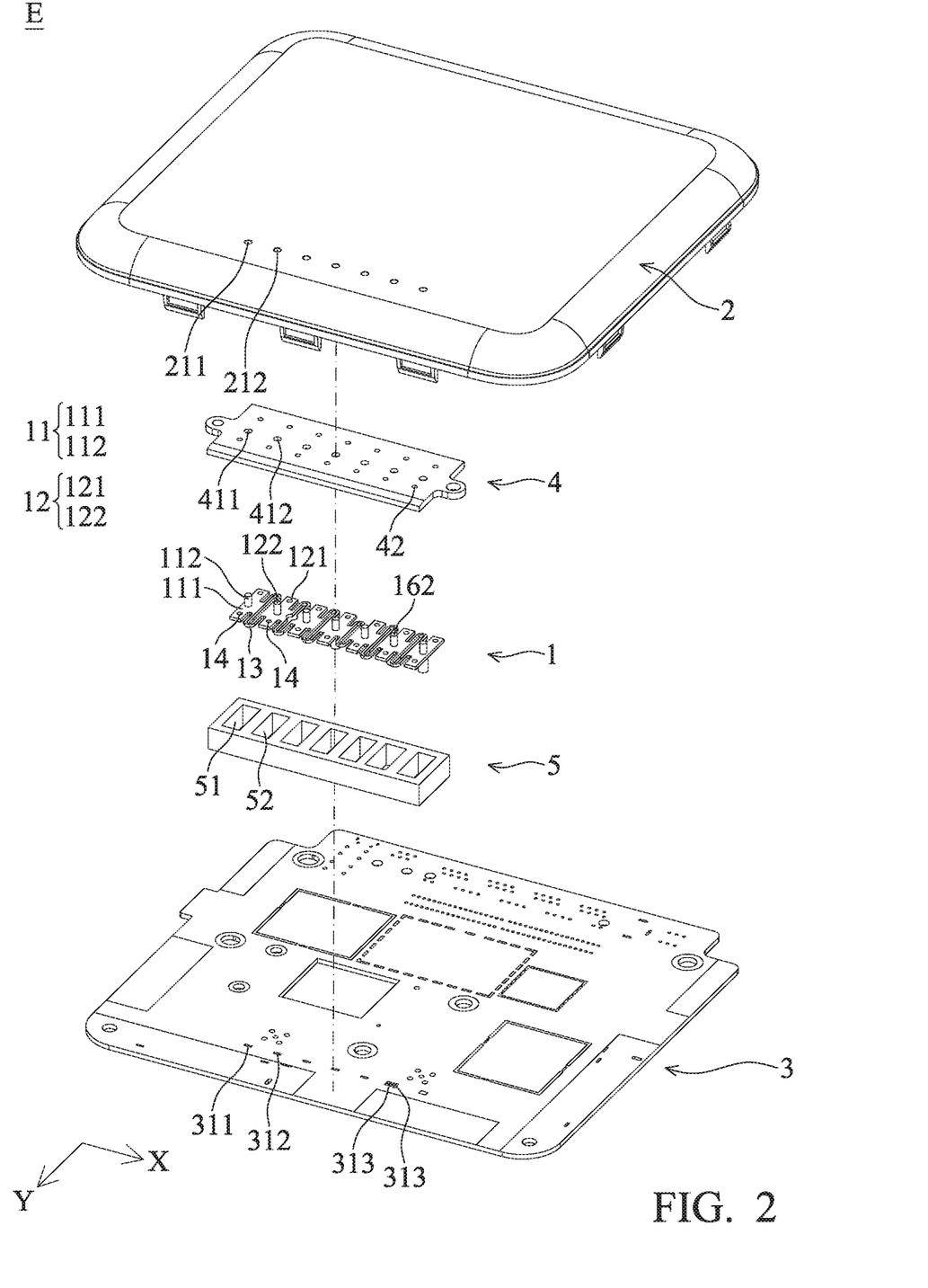
FIG. 2 shows an electronic device E of an embodiment of the invention.

FIG. 2 shows an electronic device E of an embodiment of the invention. The electronic device E includes a housing 2, a circuit board 3 and the light guide module 1. The housing 2 includes a first housing opening 211 and a second housing opening 212. The circuit board 3 includes a first light source 311 and a second light source 312. The first light source 311 provides a first light, and the second light source 312 provides a second light. The light guide module 1 includes a first light guide unit 11, a second light guide unit 12 and a first elastic unit 13. The first light guide unit 11 corresponds to the first light source 311 and the first housing opening 211. The first light guide unit 11 guides the first light, and the first light passes through the first housing opening 211. The second light guide unit 12 corresponds to the second light source 312 and the second housing opening 212. The second light guide unit 12 guides the second light, and the second light passes through the second housing opening 212. The first elastic unit 13 is disposed between the first light guide unit 11 and the second light guide unit 12.

In one embodiment, the first light guide post 112 corresponds to the first light source 311 and the first housing opening 211, and the second light guide post 122 corresponds to the second light source 312 and the second housing opening 212.

With reference to FIG. 2, in one embodiment, the electronic device E further comprises a shade 4, wherein the shade 4 comprises a first shade opening 411 and a second shade opening 412. The first light guide post 112 is inserted into the first shade opening 411. The second light guide post 122 is inserted into the second shade opening 412. In one embodiment, the shade 4 is located between the first unit base 111 and the first housing opening 211.

FIGS. 3A, 3B, 3C and 3D show the assembling process of the electronic device of the embodiment of the invention. With reference to FIGS. 2, 3A, 3B and 3C, in one embodiment, the housing 2 comprises a plurality of latches 22, and the shade 4 comprises a plurality of shade positioning holes 42. The first unit base 111 and the second unit base 121 comprises a plurality of base positioning holes 14, and each latch 22 passes through one of the shade positioning holes 42 and one of the base positioning holes 14.

Figure 3A:
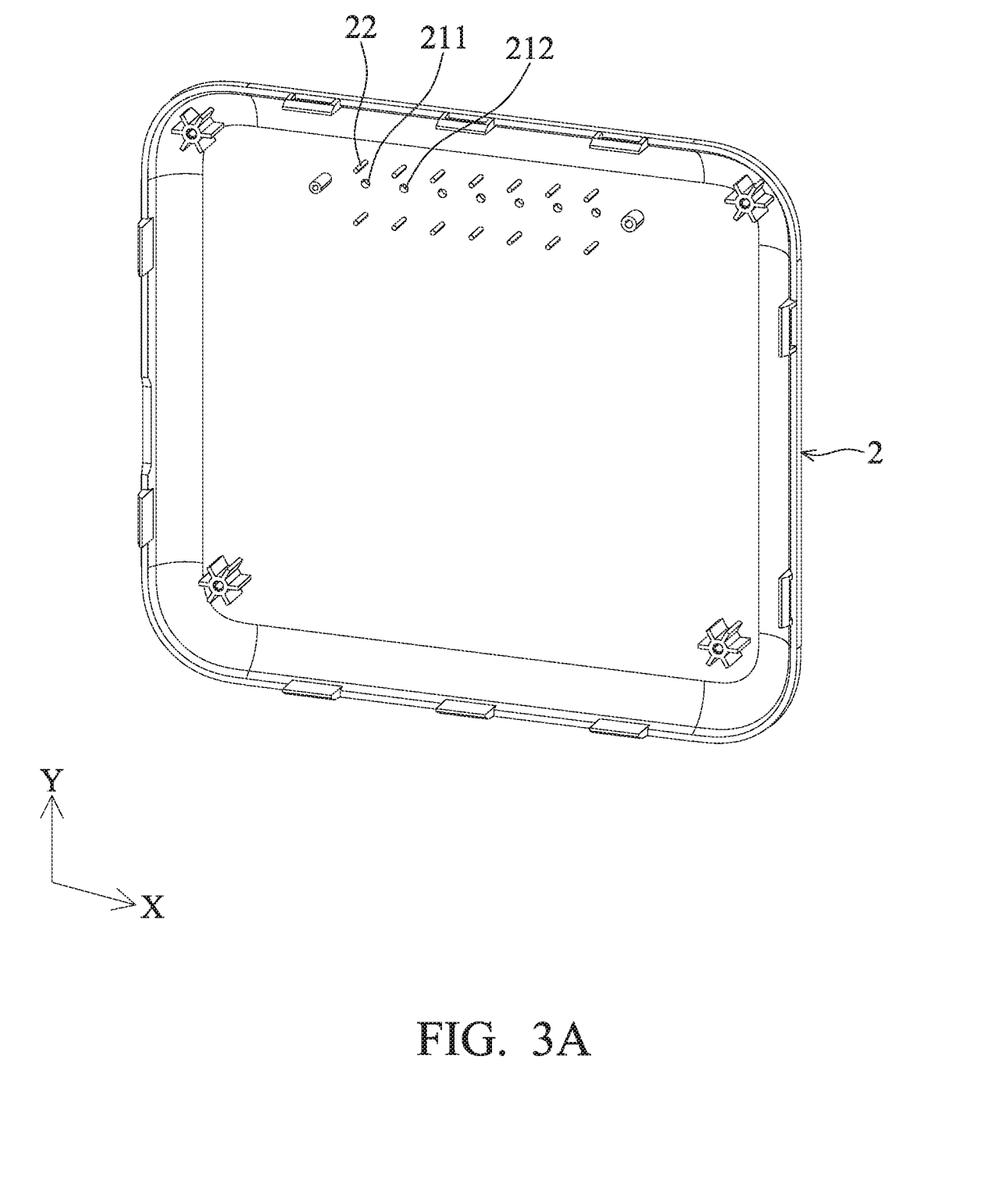
FIGS. 3A, 3B, 3C and 3D show the assembling process of the electronic device of the embodiment of the invention.
Figure 3B:
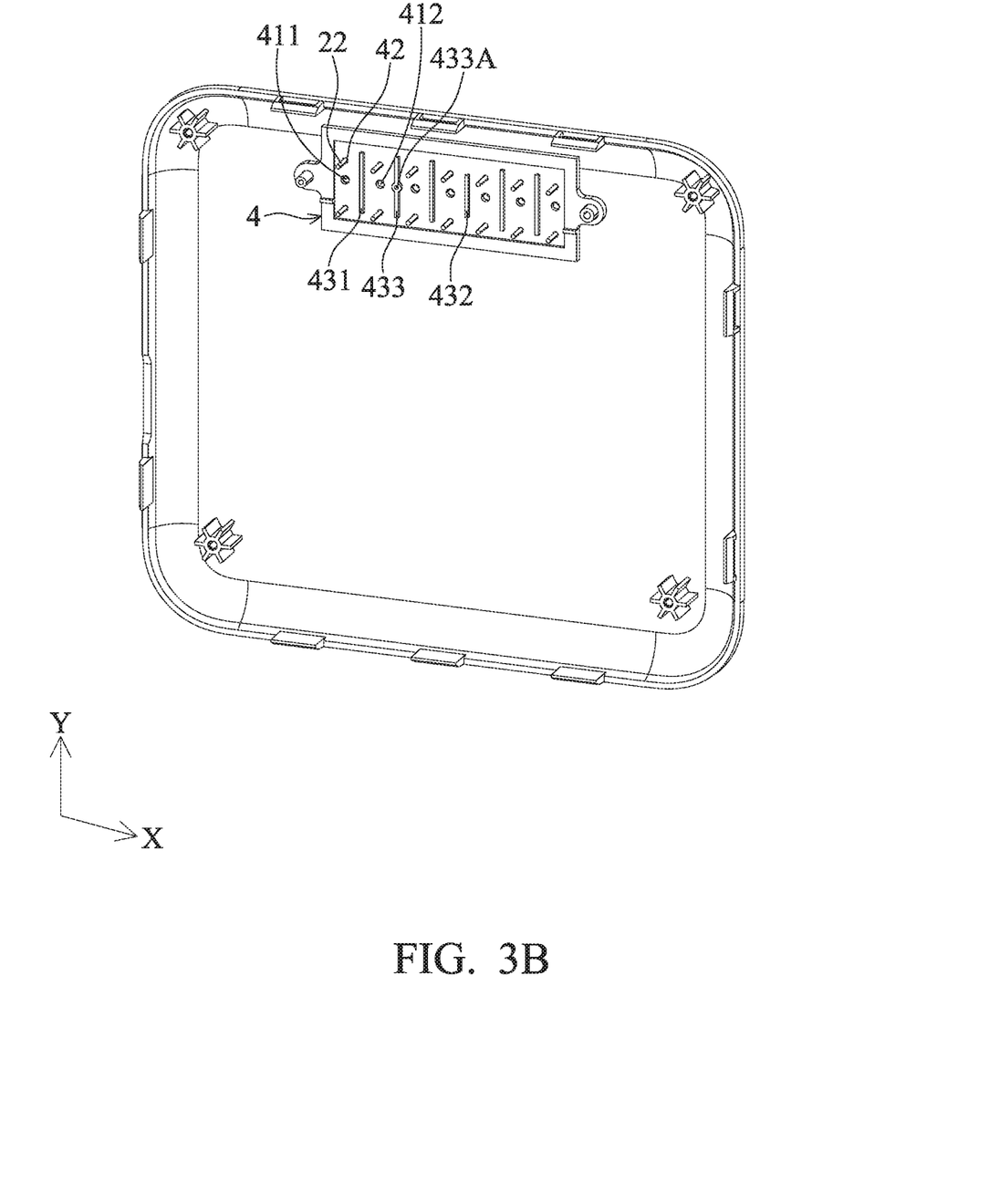
Figure 3C:
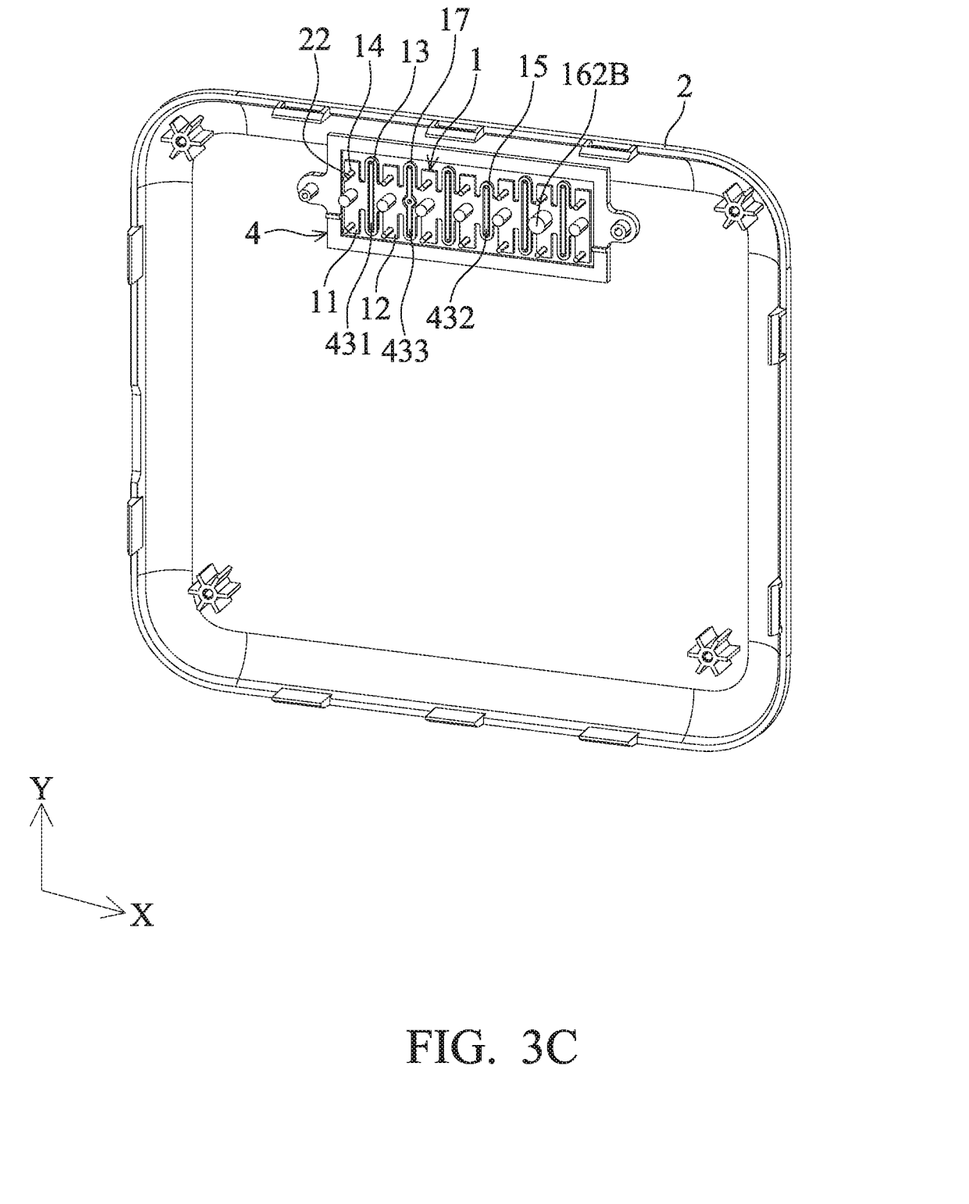

With reference to FIGS. 3B and 3C, in one embodiment, the light guide module 1 is restricted on the shade 4, and the shade 4 is affixed to the housing 2. The shade 4 comprises a first rib 431, and the first rib 431 abuts the first elastic unit 13 to restrict the position of the light guide module 1. The shade 4 prevents the first light from being mixed with the second light.

Figure 3D:
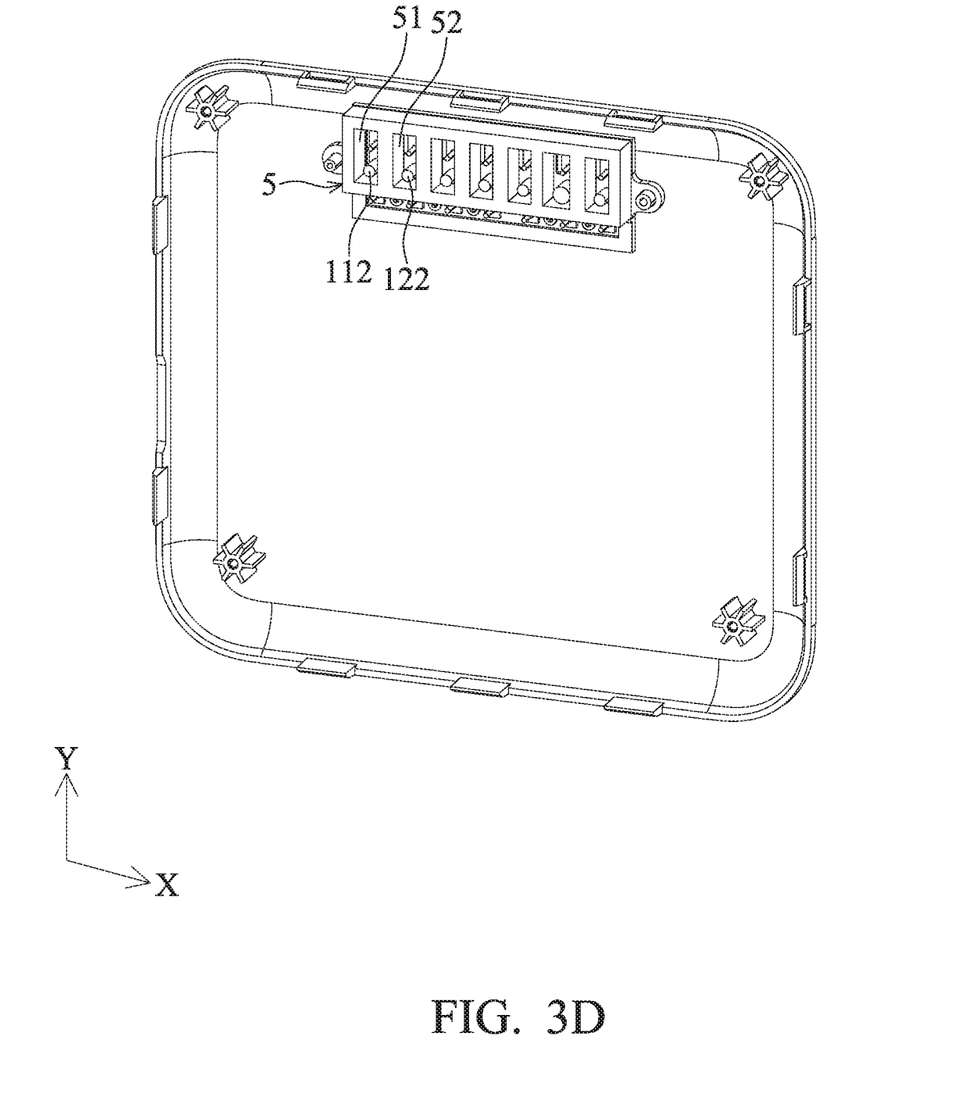

With reference to FIGS. 2 and 3D, in one embodiment, the electronic device further comprises a shielding frame 5. The shielding frame 5 comprises a first frame grid 51 and a second frame grid 52. The first light guide post 112 extends in the first frame grid 51. The second light guide post 122 extends in the second frame grid 52. At least a portion of the light guide module 1 is sandwiched between the shielding frame 5 and the shade 4. The shielding frame 5 prevents the first light from being mixed with the second light.

With reference to FIGS. 1A and 3C, in one embodiment, the light guide module further comprises a second elastic unit 15. In a second direction Y, the second elastic unit 15 is smaller than the first elastic unit 13. Therefore, incorrect assembly of the light guide module 1 can be prevented. In one embodiment, the shade 4 and the second rib 432 abut the second elastic unit 15 to restrict the position of the light guide module 1.

With reference to FIGS. 1B, 2 and 3D, in one embodiment, the first light guide post 112 comprises a first section 112A and a second section 112B. The first section 112A and the second section 112B are formed on opposite surfaces of the first unit base 111. The first section 112A is inserted into the first shade opening 411, and the second section 112B extends in the first frame grid 51.

With reference to FIGS. 1A, 1B, 2 and 3C, in one embodiment, the circuit board 3 further comprises a plurality of third light sources 313. The light guide module 1 comprises a third light guide unit 16. A third light guide post 162 of the third light guide unit 16 corresponds to the third light sources 313. The third light guide post 162 comprises a third section 162A and a fourth section 162B. The diameter of the third section 162A is smaller than the diameter of the fourth section 162B. The fourth section 162B can sufficiently corresponds to the third light sources 313.

With reference to FIGS. 1C, 3B and 3C, in one embodiment, the light guide module further comprises a third elastic unit 17. The shade 4 comprises a third rib 733. The third rib 433 abuts the third elastic unit 17 to restrict the position of the light guide module 1, and to prevent incorrect assembly of the light guide module 1. In one embodiment, a circular hole 171 is formed on the third elastic unit 17. The third rib 433 comprises a circular protrusion 433A, and the circular protrusion 433A matches the circular hole 171.

In the light guide module of the embodiment of the invention, the elastic unit is utilized to adjust the distance between the first light guide unit and the second light guide unit. Therefore, even though housings are manufactured differently, the first light guide unit and the second light guide unit can be made to correspond sufficiently to the first housing opening and the second housing opening. Conventional problems such as light mixing and insufficient light output can be prevented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light guide module, comprising:
   a first light guide unit;
   a second light guide unit;
   an elastic unit, disposed between the first light guide unit and the second light guide unit, wherein one side of the elastic unit is connected to the first light guide unit, and the other side of the elastic unit is connected to the second light guide unit,
   wherein in an initial state, a first distance is formed between the first light guide unit and the second light guide unit, and in an extended state, the elastic unit is elastically deformed, and a second distance is formed between the first light guide unit and the second light guide unit,
   wherein the first light guide unit comprises a first unit base and a first light guide post, the second light guide unit comprises a second unit base and a second light guide post, the first light guide post is connected to the first unit base, the second light guide post is connected to the second unit base, one side of the elastic unit is connected to the first unit base, and the other side of the elastic unit is connected to the second unit base,
   wherein the first light guide post comprises a first section and a second section, and the first section and the second section protrude from opposite surfaces of the first unit base.

2. The light guide module as claimed in claim 1, wherein the first light guide unit, the second light guide unit and the elastic unit are integrally formed.

3. The light guide module as claimed in claim 1, wherein in the initial state, the first light guide post is naturally parallel to the second light guide post, and in the extended state, the first light guide post is naturally parallel to the second light guide post.

4. The light guide module as claimed in claim 1, wherein in the initial state, the first unit base, the second unit base and the elastic unit are located on the same plane, and in the extended state, the first unit base, the second unit base and the elastic unit are also located on the same plane.

5. The light guide module as claimed in claim 1, wherein the elastic unit comprises a first elastic arm and a second elastic arm, the first elastic arm faces the second elastic arm, one end of the first elastic arm is connected to the first unit base, the other end of the first elastic arm is connected to the second unit base, one end of the second elastic arm is connected to the first unit base, and the other end of the second elastic arm is connected to the second unit base.

6. The light guide module as claimed in claim 5, wherein the first elastic arm and the second elastic arm are U-shaped.

7. The light guide module as claimed in claim 6, wherein in the initial state, the first distance is formed between the first light guide unit and the second light guide unit in the first direction, and in the extended state, the second distance is formed between the first light guide unit and the second light guide unit in the first direction, the first elastic arm has an elastic arm length in a second direction, a third distance is formed between the first elastic arm and the second elastic arm in the second direction, and in the initial state, a ratio of the elastic arm length to the third distance is greater than 0.9, and the first direction is perpendicular to the second direction.

8. An electronic device, comprising:
   a housing, comprising a first housing opening and a second housing opening;
   a circuit board, comprising a first light source and a second light source, wherein the first light source provides a first light, and the second light source provides a second light; and
   a light guide module, comprising:
      a first light guide unit, corresponding to the first light source and the first housing opening, wherein the first light guide unit guides the first light, and the first light passes through the first housing opening;
      a second light guide unit, corresponding to the second light source and the second housing opening, wherein the second light guide unit guides the second light, and the second light passes through the second housing opening;
      a first elastic unit, disposed between the first light guide unit and the second light guide unit, wherein one side of the first elastic unit is connected to the first light guide unit, and the other side of the first elastic unit is connected to the second light guide unit,
      wherein in an initial state, a first distance is formed between the first light guide unit and the second light guide unit, and in an extended state, the first elastic unit is elastically deformed, and a second distance is formed between the first light guide unit and the second light guide unit.

9. The electronic device as claimed in claim 8, wherein the first light guide unit comprises a first unit base and a first light guide post, the second light guide unit comprises a second unit base and a second light guide post, the first light guide post is connected to the first unit base, the second light guide post is connected to the second unit base, one side of the first elastic unit is connected to the first unit base, the other side of the first elastic unit is connected to the second unit base, the first light guide post corresponds to the first light source and the first housing opening, and the second light guide post corresponds to the second light source and the second housing opening.

10. The electronic device as claimed in claim 9, further comprising a shade, wherein the shade comprises a first shade opening and a second shade opening, the first light guide post is inserted into the first shade opening, and the second light guide post is inserted into the second shade opening.

11. The electronic device as claimed in claim 10, wherein the shade is located between the first unit base and the first housing opening.

12. The electronic device as claimed in claim 10, wherein the light guide module is restricted on the shade, and the shade is affixed to the housing.

13. The electronic device as claimed in claim 12, wherein the housing comprises a plurality of latches, the shade comprises a plurality of shade positioning holes, the first unit base and the second unit base comprises a plurality of base positioning holes, and each latch passes through one of the shade positioning holes and one of the base positioning holes.

14. The electronic device as claimed in claim 10, further comprising a shielding frame, wherein the shielding frame comprises a first frame grid and a second frame grid, the first light guide post extends in the first frame grid, the second light guide post extends in the second frame grid, and at least a portion of the light guide module is sandwiched between the shielding frame and the shade.

15. The electronic device as claimed in claim 14, wherein the first light guide post comprises a first section and a second section, the first section and the second section are formed on opposite surfaces of the first unit base, the first section is inserted into the first shade opening, and the second section extends in the first frame grid.

16. The electronic device as claimed in claim 9, wherein in the initial state, the first distance is formed between the first light guide unit and the second light guide unit in a first direction, and in the extended state, the second distance is formed between the first light guide unit and the second light guide unit in the first direction, the light guide module further comprises a second elastic unit, and in a second direction, a size of the second elastic unit is smaller than a size of the first elastic unit.

\* \* \* \* \*